US009242875B2

(12) United States Patent
Tamura et al.

(10) Patent No.: US 9,242,875 B2
(45) Date of Patent: Jan. 26, 2016

(54) CALCIUM REMOVAL METHOD (75) Inventors: Noritoshi Tamura, Chiba (JP); Takayuki Suzuki, Chiba (JP); Hirokazu Otani, Saitama (JP)

(73) Assignee: Taiheiyo Cement Corporation, Tokyo (JP)

( * ) Notice: Subject to any disclaimer, the term of this patent is extended or adjusted under 35 U.S.C. 154(b) by 252 days.

(21) Appl. No.: 13/703,879

(22) PCT Filed: May 11, 2011

(86) PCT No.: PCT/JP2011/060821
§ 371 (c)(1),
(2), (4) Date: Jan. 24, 2013

(87) PCT Pub. No.: WO2011/162033
PCT Pub. Date: Dec. 29, 2011

(65) Prior Publication Data
US 2013/0200002 A1 Aug. 8, 2013

(30) Foreign Application Priority Data

Jun. 21, 2010 (JP) .................................. 2010-140207

(51) Int. Cl.
C02F 1/42 (2006.01)
B01J 39/04 (2006.01)
(Continued)

(52) U.S. Cl.
CPC . *C02F 1/42* (2013.01); *B01J 39/04* (2013.01); *B01J 43/00* (2013.01); *B01J 47/145* (2013.01);
(Continued)

(58) Field of Classification Search
CPC .... C02F 1/42; C02F 2209/05; C02F 2209/06; C02F 2209/29; C02F 1/5245; B01J 43/00; B01J 47/14; B01J 49/00; B01J 39/04
USPC ................. 210/673, 686, 687, 739, 743, 746, 210/747.1; 106/751, 752; 405/128.45, 405/128.5
See application file for complete search history.

(56) References Cited

U.S. PATENT DOCUMENTS 3,019,183 A * 1/1962 Gomella ........................ 210/670
3,078,140 A * 2/1963 Hatch ........................... 423/100
(Continued)

FOREIGN PATENT DOCUMENTS

JP 54040279 A * 3/1979 .................... 210/673
JP 11100243 4/1999
(Continued)

OTHER PUBLICATIONS

Extended/Supplementary European Search Report for Patent Application No. EP11797921.1 (PCT/JP2011060821). Oct. 16, 2013; 7 pages.

*Primary Examiner* — Matthew O Savage
(74) *Attorney, Agent, or Firm* — Stetina Brunda Garred & Brucker (57) ABSTRACT In accordance with the present invention, there is provided a calcium removal method capable of reducing operation cost. A solution L2 containing potassium or/and sodium, and calcium is passed through an ion-exchange resin 35 to separate the solution into a solution containing potassium or/and the sodium, and a solution containing calcium. Operation cost can remarkably be decreased since potassium carbonate is not required to remove calcium as before. Timing for changing a calcium-containing water L3 and a salt water L4 discharged from the ion-exchange resin can be performed based on at least one measurement result selected from the group consisting of: a calcium or chlorine concentration; electrical conductivity; and pH of a fluid which is discharged from said ion-exchange resin. The solution may be a filtrate L1 that is obtained by washing a chlorine bypass dust D generated in a cement burning process, or a leachate W of a final disposal site 50.

14 Claims, 9 Drawing Sheets (51) Int. Cl.
*B01J 43/00* (2006.01)
*B01J 47/14* (2006.01)
*B01J 49/00* (2006.01)
*C02F 1/52* (2006.01)

(52) U.S. Cl.
CPC ........... *B01J 49/0008* (2013.01); *C02F 1/5245* (2013.01); *C02F 2209/05* (2013.01); *C02F 2209/06* (2013.01); *C02F 2209/29* (2013.01)

(56) References Cited

U.S. PATENT DOCUMENTS

4,478,722 A * 10/1984 Boom ........................... 210/672
6,482,305 B1 * 11/2002 Mani .............................. 204/534
2006/0060537 A1 * 3/2006 Takihara et al. ............. 210/656
2007/0102154 A1 5/2007 Grott
2008/0264872 A1 * 10/2008 Konishi et al. ................ 210/710
2010/0065502 A1 3/2010 Konishi

FOREIGN PATENT DOCUMENTS

| | | |
|---|---|---|
| JP | 2003053339 | 2/2003 |
| JP | 2005314178 | 10/2005 |
| JP | 2007331993 | 12/2007 |

* cited by examiner

CALCIUM REMOVAL METHOD

CROSS-REFERENCE TO RELATED APPLICATIONS

The present application claims priority to International Application No. PCT/JP2011/060821 filed May 11, 2011, which claims priority to Japanese Patent Application No. 2010-140207 filed Jun. 21, 2010.

STATEMENT RE: FEDERALLY SPONSORED RESEARCH/DEVELOPMENT

Not Applicable

BACKGROUND OF THE INVENTION

1. Technical Field of the Invention

The present invention relates to a calcium removal method, and more particularly to a method of removing calcium contained in filtrate and others, which are obtained by washing chlorine bypass dust collected by a chlorine bypass system attached to a cement manufacturing facility.

2. Description of the Related Art

Chlorine bypass systems have been used to remove chlorine that may cause troubles such as preheater clogging in cement manufacturing facilities. In recent years, recycling of waste through conversion to cement raw material or fuel has been promoted, which increases the quantity of volatile matters such as chlorine, and the quantity of chlorine bypass dust generated as the quantity of the treated waste increases, which necessitates developments of methods for effectively utilizing the chlorine bypass dust.

From the above-mentioned point of view, in a treatment method through conversion to cement raw material described in Patent Document 1, to wastes containing chlorine is added water to allow the chlorine in the wastes to be eluted and filtrated; desalted cake obtained is utilized as a cement raw material; and waste water is purified and is discharged as it is or salt is recovered from the waste water, which makes it possible to effectively utilize the chlorine bypass dust without causing environmental pollution.

However, in this method, when desalting the chlorine bypass dust, in order to reduce selenium concentration in waste water to a safety level, for instance, to 0.1 mg-Se/l when discharged to sewage, ferrous chloride (FeCl2) as a reducing agent is required more or equal to 8000 mg-$Fe^{2+}$/l, so that a large amount of reduction agent is consumed to remove selenium, resulting in a problem of skyrocketing operation cost.

Figure 9:
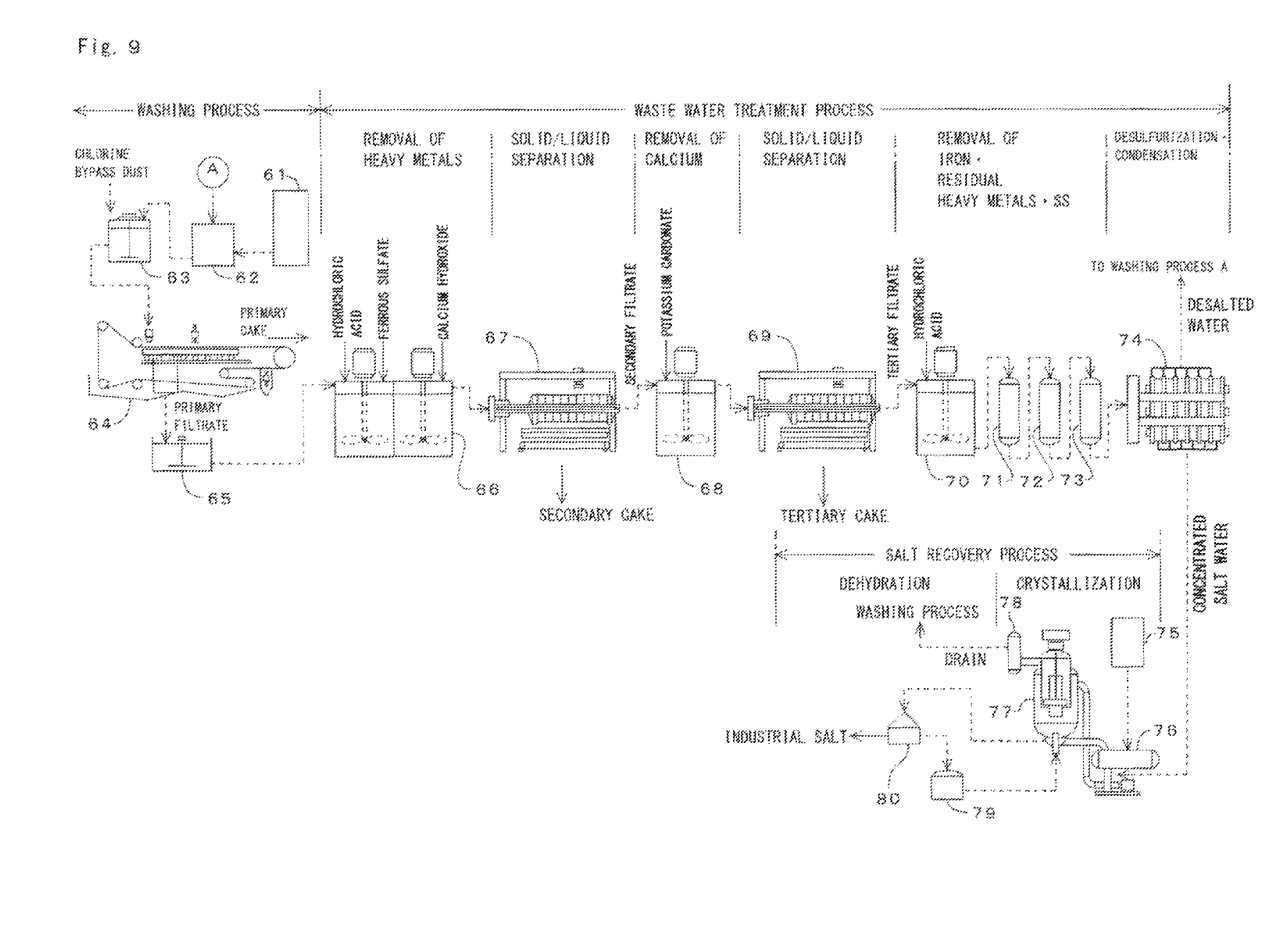
FIG. 9 is a flow chart showing an example of a conventional system for treating dust contained in extracted cement kiln combustion gas.

Then, in order to resolve the above-mentioned problems, the applicant proposed, in Patent Document 2, a method of treating dust contained in extracted cement kiln combustion gas as shown in FIG. 9.

The treating method roughly divided into a washing process for washing the chlorine bypass dust to remove chlorine component, a waste water treatment process for removing heavy metals such as selenium from a filtrate, and a salt recovery process for recovering salt from concentrated salt water to obtain industrial salt.

In the washing process, a hot water generated in a boiler 61 is fed to a dissolution tank 63 through a hot water tank 62 so as to be mixed with the chlorine bypass dust. With this, water soluble chlorine component contained in the chlorine bypass dust dissolves in the hot water. A slurry discharged from the dissolution tank 63 is solid-liquid separated in a belt filter 64, and a primary cake from which chlorine component is removed is returned to cement kilns or the like to utilize it as a cement raw material. On the other hand, a primary filtrate containing chlorine component and heavy metals such as selenium is temporally stored in a storage tank 65.

In the waste water treatment process, the primary filtrate, which is stored in the storage tank 65, containing chlorine component, heavy metals such as selenium, and calcium is supplied to a chemical liquid reaction tank 66, and hydrochloric acid as a pH adjuster is added thereto to adjust pH in the chemical liquid reaction tank 66 below or equal to 4. After reducing and depositing selenium as a heavy metal contained in the waste water with ferrous sulfate, calcium hydroxide is added thereto to increase pH between 8 and 11, and ferrous hydroxide generated by adding ferrous sulfate is flocculated and deposited.

Next, a slurry discharged from the chemical liquid reaction tank 66 is solid-liquid separated by a filter press 67, and the secondary cake is returned to cement kilns or the like to utilize it as a cement raw material, and the secondary filtrate is mixed with potassium carbonate in the chemical liquid reaction tank 68 to remove calcium in the secondary filtrate.

Next, a slurry discharged from the chemical liquid reaction tank 68 is solid-liquid separated by a filter press 69, and the tertiary cake is returned to cement kilns or the like to utilize it as a cement raw material, and the tertiary filtrate is adjusted in pH in a storage tank 70 by adding hydrochloric acid, and iron, residual heavy metals and suspending substances (SS) are removed by an iron removal tower 71, a chelating resin tower 72 and a filtering device 73.

A waste water from the filtering device 73 is fed to an electrodialysis device 74, and in the electrodialysis device 74, selenium acid ($SeO_4 2-$) in the waste water is included in a desalted water, and chlorine component is included in a concentrated salt water. The desalted water from the electrodialysis device 74 is returned to the hot water tank 62 in the washing process through a circulation route not shown (refer to symbol A).

Further, in the salt recovery process, the concentrated salt water is heated in a heater 76 with vapor from the boiler 75 to perform crystallization in a crystallizer 77. In the crystallizer 77, solute in the concentrated salt water is deposited as crystals, through a centrifugal separator 80, industrial salt with potassium chloride as a main ingredient is recovered, which can be utilized as an industrial raw material. On the other hand, moisture which evaporated in the crystallizer 77 is cooled in a condenser 78 to recover drainage, which is returned to the washing process. A filtrate separated in the centrifugal separator 80 is returned to the crystallizer 77 through a filtrate tank 79. It is also possible to release the concentrated salt water without collecting salt therefrom.

Patent document 1: Japanese Patent Publication Heisei 11-100243 gazette.

Patent document 2: Japanese Patent Publication 2004-330148 gazette.

However, in the method of treating dust contained in extracted cement kiln combustion gas described in the Patent Document 2, after removing heavy metals in the chemical liquid reaction tank 66, in the chemical liquid reaction tank 68 is removed calcium in the secondary filtrate by adding potassium carbonate, the expense for adding the potassium carbonate increases, which causes a problem of skyrocketing operation cost.

the present invention has been made in consideration of the above problems in the conventional art, and the object thereof is to provide a calcium removal method and so on which makes it possible to decrease cost for chemicals to remove calcium and suppress operation cost.

SUMMARY OF THE INVENTION

To achieve the above object, the present invention relates to a calcium removal method, and the method is characterized by passing a solution containing potassium or/and sodium, and calcium through an ion-exchange resin to separate the solution into a solution containing potassium or/and the sodium, and a solution containing calcium.

With the present invention, the solution is separated into a solution containing potassium or/and the sodium, and a solution containing calcium by using the ion-exchange resin, so that operation cost is remarkably decreased without adding potassium carbonate as before.

In the above calcium removal method, the solution containing potassium or/and sodium, and calcium can be a filtrate obtained by washing chlorine bypass dust generated in a cement burning process, which makes it possible to decrease operation cost of the chlorine bypass system.

In the above calcium removal method, an amount of the filtrate supplied to the ion-exchange resin and an amount of a regeneration water supplied to the ion-exchange resin can be adjusted to equalize an amount of separated calcium-containing water to the amount of the supplied filtrate. With this, all of the separated calcium-containing water can be returned to a washing process, which avoids discharging the water out of the system. Additionally in this case, a solution containing potassium or/and sodium and a solution containing calcium can accurately be separated.

In the above calcium removal method, an amount of the filtrate supplied to the ion-exchange resin and an amount of a regeneration water supplied to the ion-exchange resin may be adjusted to increase an amount of separated calcium-containing water than the amount of the supplied filtrate. With this, a part or all of the separated calcium-containing water can be used in a cement manufacturing process.

In the above calcium removal method, at least one selected from the group consisting of: adjustment of the amount of the filtrate supplied to the ion-exchange resin; adjustment of the amount of the regeneration water supplied to the ion-exchange resin; and control of timing for changing liquids discharged from the ion-exchange resin may be performed based on at least one measurement result selected from the group consisting of: a calcium or chlorine concentration; electrical conductivity; and pH of a fluid which is discharged from the ion-exchange resin.

In addition, the solution can be a leachate of a final disposal site, which performs the treatment of harmful leachate in a final disposal site at low cost.

Further, the present invention relates to an ion-exchange resin, and the ion-exchange resin is characterized by passing a solution containing potassium or/and sodium, and calcium through the ion-exchange resin to separate the solution into a solution containing potassium or/and the sodium, and a solution containing calcium. With this, in the same manner as the above invention, operation cost can remarkably be reduced.

As described above, with the present invention, it is possible to provide a calcium removal method and so on which can decrease cost for chemicals to remove calcium and suppress operation cost.

Next, embodiments to carry out the present invention will be explained with reference to drawings.

DETAILED DESCRIPTION OF THE INVENTION

Figure 1:
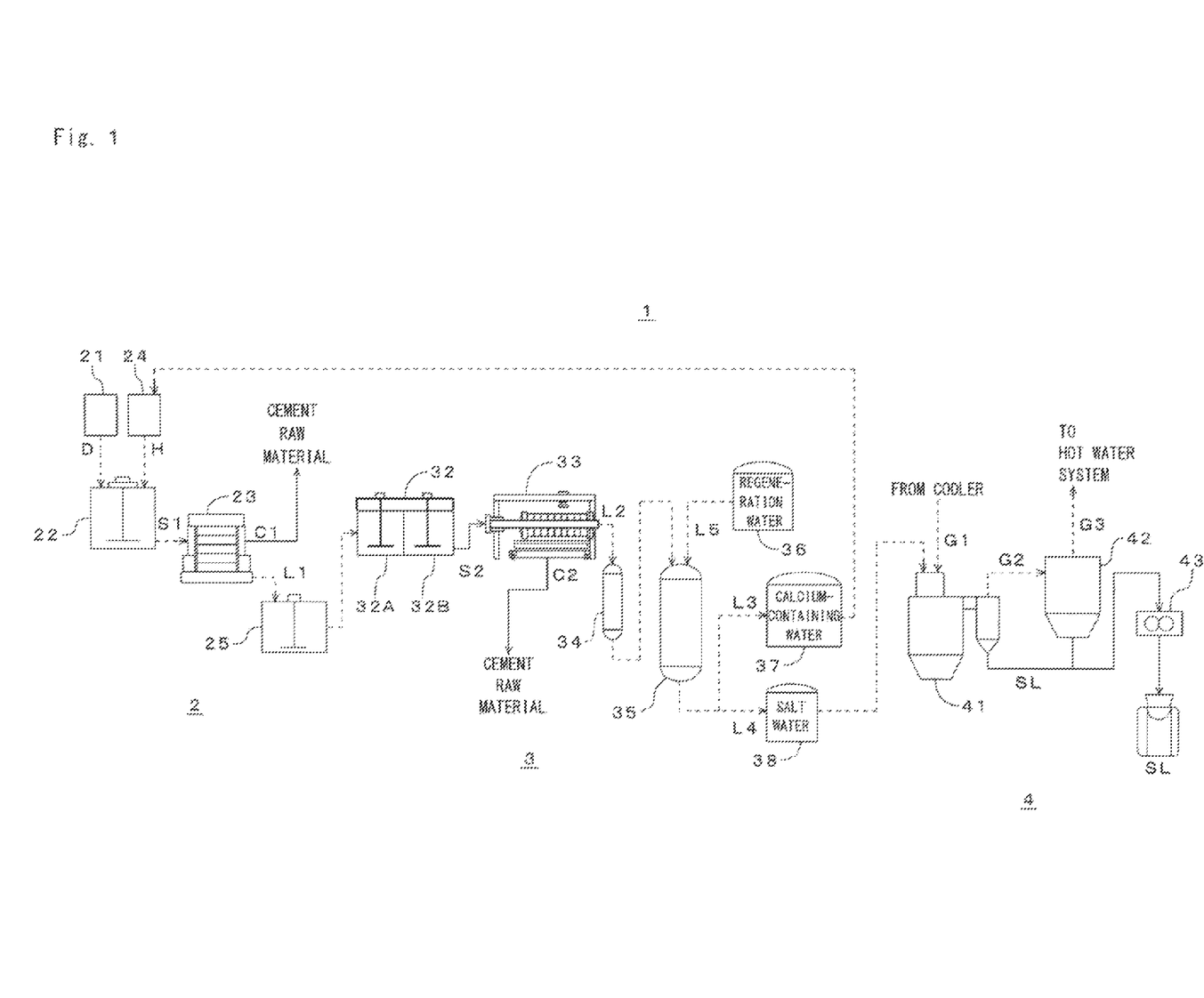
FIG. 1 is a flow chart showing an example of a system for treating dust contained in extracted cement kiln combustion gas to which a calcium removal method of the present invention is applied.

FIG. 1 shows, as the first embodiment, a system for treating dust contained in extracted cement kiln combustion gas to which a calcium removal method of the present invention is applied, and this system 1 comprises, in order to effectively use chlorine bypass dust contained in combustion gas extracted from an inlet end or the like of a cement kiln after washing it, a washing process 2, a calcium and others removal process 3 for removing calcium and heavy metals, and a salt recovery process 4.

The washing process 2 comprises a dissolution tank 22 for dissolving chlorine component contained in chlorine bypass dust D stored in a tank 21, a filtering machine 23 for solid/liquid separating a slurry S1 discharged from the dissolution tank 22 into a cake C1 and a filtrate L1, a hot water tank 24 for supplying hot water H to the dissolution tank 22 and a storage tank 25 for storing the filtrate L1.

The hot water tank 24 is installed to store the hot water H for industrial use obtained by heating a calcium-containing water L3 stored in a calcium-containing water tank 37 of the below-mentioned calcium and others removal process 3 with a hot gas G3 discharged from a bag filter 42 of the salt recovery process 4.

The calcium and others removal process 3 comprises chemical liquid reaction tanks 32 (32A, 32B) for removing heavy metals in the filtrate L1 provided from the storage tank 25, a filter press 33 for solid-liquid separating a slurry S2 discharged from the chemical liquid reaction tank 32 into a cake C2 and a filtrate L2, a sand filtering machine 34 for filtering the filtrate L2 discharged from the filter press 33, an ion-exchange resin 35 for removing calcium contained in the filtrate L2 provided from the sand filtering machine 34, a regeneration water tank 36 for storing regeneration water L5 providing to the ion-exchange resin 35, a calcium-containing water tank 37 and a salt water tank 38 for respectively storing the calcium-containing water L3 and a salt water L4 discharged from the ion-exchange resin 35.

The chemical liquid reaction tank 32A is installed to generate lead sulfide (PbS), thallium sulfide (Tl2S) and others by adding sodium hydrogen sulfide (NaHS) to the filtrate L1. The chemical liquid reaction tank 32B is installed to add ferrous chloride (FeCl2) to the filtrate L1 provided from the chemical liquid reaction tank 32A; flocculate the generated lead sulfide and thallium sulfide to facilitate solid-liquid separation; and precipitate dissolved selenium by reducing it for solid-liquid separation.

The filter press 33 is installed to solid/liquid separate the slurry S2 discharged from the chemical liquid reaction tank 32B to solid/liquid separate the slurry S2 into the cake C2 containing thallium sulfide and lead sulfide, and the filtrate L2.

The ion-exchange resin 35 is installed to remove calcium contained in the filtrate L2 discharged from the sand filtering machine 34, and an amphoteric ion-exchange resin or the like can be used. The amphoteric ion-exchange resin is a resin having crosslinked polystyrene or the like as a base material and quaternary ammonium group, carboxylic acid group and the like in the same functional group chain to provide a function of ion-exchanging the both of cations and negative ions. For example, an amphoteric ion-exchange resin made by Mitsubishi Chemical Corporation, DIAION (registered trademark) AMPO3 may be used. This ion-exchange resin 35 can perform separation of electrolyte and non-electrolyte, and further electrolytes can be separated from each other with the resin 35 also.

The salt recovery process 4 comprises a spray dryer 41 for obtaining industrial salt SL by drying the salt water L4 stored in the salt water tank 38 with hot gas G1 discharged from clinker cooler (not shown), which is attached to a cement kiln, a bag filter 42 for collecting the industrial salt SL contained in an exhaust gas G2 discharged from the spray dryer 41 and a pelletizer 43 for pelletizing the industrial salt SL collected by the spray dryer 41 and the bag filter 42.

The spray dryer 41, of which drawing is omitted, comprises a microatomization device, a hot wind introduction device, a drying chamber, a dried powder separating/collecting device, exhaust treatment device, and a product cooling device, and dries the salt water L4 by spraying the salt water L4 from the microatomization device to the cooler exhaust gas G1 that is introduced to the drying chamber via the hot wind introduction device.

Next, the motion of the treatment system 1 with the above-mentioned construction will be explained with reference to FIG. 1.

The chlorine bypass dust D stored in the tank 21 is fed to the dissolution tank 22, and water-soluble chlorine component contained in the chlorine bypass dust D is dissolved in the hot water H fed from the hot water tank 24. The slurry S1 discharged from the dissolution tank 22 is solid/liquid separated into the filtrate L1 and the cake C1 by the filtering machine 23, and the cake C1 from which chlorine component was removed is used as a cement raw material.

On the other hand, the filtrate L1 containing chlorine component is fed to the chemical liquid reaction tank 32A, and sodium hydro sulfide as a sulfurizing agent is added to the filtrate L1 in the chemical liquid reaction tank 32A, and lead and thallium in the filtrate L1 are sulfurized to generate lead sulfide and thallium sulfide.

Next, the filtrate L1 is fed from the chemical liquid reaction tank 32A to the chemical liquid reaction tank 32B, and ferrous chloride is added to the filtrate L1 to flocculate the sulfide and selenium.

Subsequently, the slurry S2 discharged from the chemical liquid reaction tank 32B is solid/liquid separated by the filter press 33 into the cake C2 and the filtrate L2, and the cake C2 containing lead sulfide, thallium sulfide, and heavy metals such as selenium is reused as a cement raw material and the like. Meanwhile, the filtrate L2 discharged from filter press 33 is filtered with the sand filtering machine 34.

Figure 2:
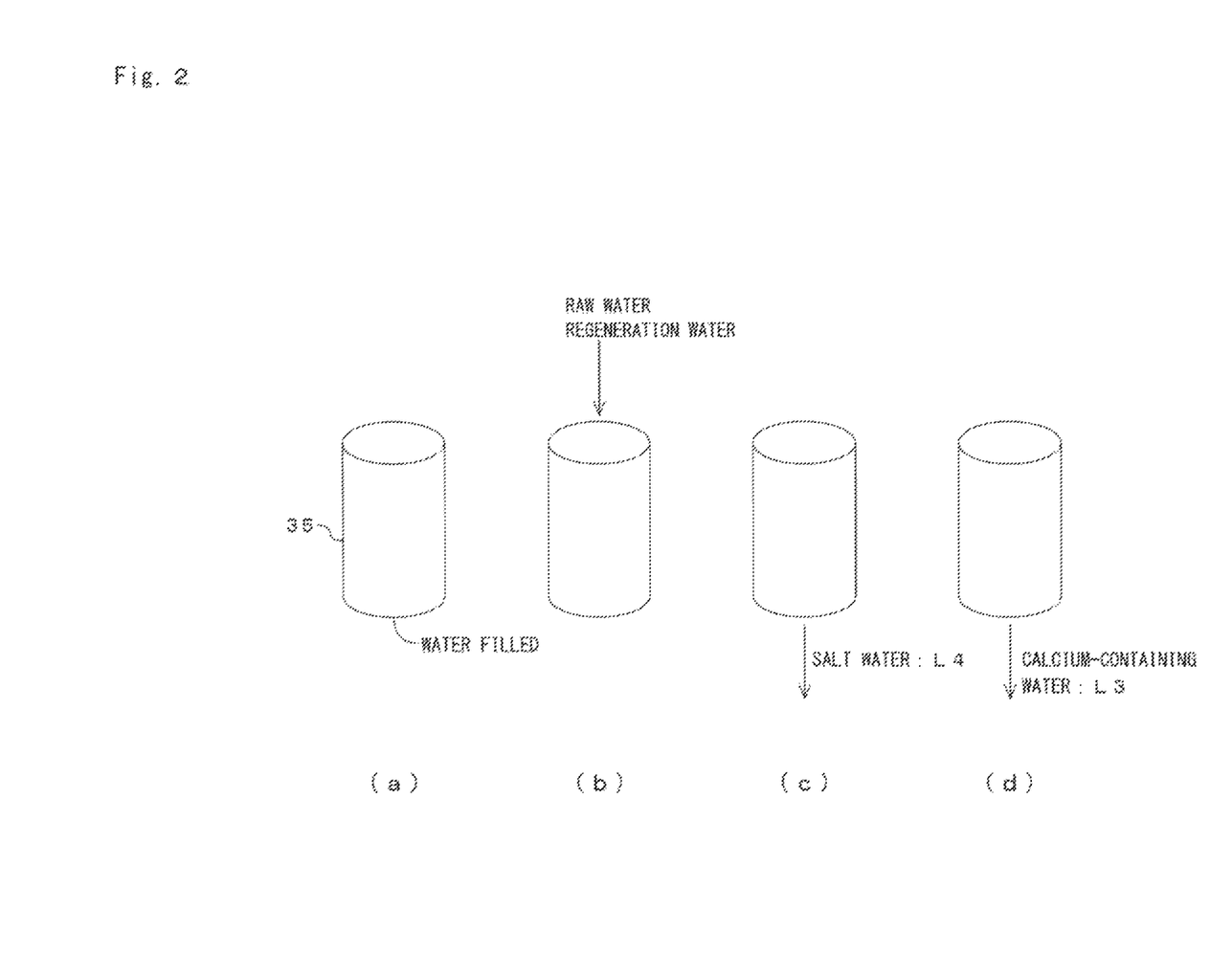
FIG. 2 is a schematic view for explaining the motion of an ion-exchange resin used for the treatment system show in FIG. 1.

Next, filtrate L2 filtered in the sand filtering machine 34 is fed to the ion-exchange resin 35, and calcium contained in the filtrate L2 is removed. As shown in FIG. 2, this ion-exchange resin 35 continuously performs batch processing in such a manner that water is filled up in advance (FIG. 2 (a)), and then, the filtrate (raw water) L2 from the sand filtering machine 34 is introduced into the ion-exchange resin 35, and regeneration water for regenerating the ion-exchange resin 35 is introduced (FIG. 2 (b)). Then, as shown in FIG. 2 (c), a salt water L4 is firstly discharged, after that, a calcium-containing water L3 is discharged in this order as time passes. Here, the timing for changing the calcium-containing water L3 and the salt water L4 can be controlled based on at least one selected from the group consisting of: adjustment of the amount of the filtrate supplied to the ion-exchange resin; adjustment of the amount of the regeneration water supplied to the ion-exchange resin; and control of timing for changing liquids discharged from the ion-exchange resin is performed based on at least one measurement result selected from the group consisting of: a calcium or chlorine concentration; electrical conductivity; and pH of a fluid which is discharged from the ion-exchange resin.

As shown in FIG. 1, the calcium-containing water L3 discharged from the ion-exchange resin 35 is returned to the hot water tank 24 as mentioned above, and the salt water L4 is dried in the salt recovery process 4 at a subsequent stage.

In the salt recovery process 4, to the spray dryer 41 is introduced the cooler exhaust gas G1, and the salt water L4 stored in the salt water tank 38 is fed to the spray dryer 41, and the filtrate is sprayed at a predetermined nozzle pressure to dry it with the cooler exhaust gas G1. The hot gas G2 used for drying the industrial salt SL is collected by the bag filter 42, and the collected industrial salt SL is pelletized with the pelletizer 43 together with the industrial salt SL dried in an air stream in the spray dryer 41. The industrial salt SL obtained in the above process contains a very small amount $K_2SO_4$ and $Na_2SO_4$ in addition to KCl and NaCl. On the other hand, the temperature of the industrial water is raised by the hot gas G3 discharged from the bag filter 42, and the obtained hot water H is stored in the hot water tank 24.

As mentioned above, with the present embodiment, to remove calcium, it is not necessary to add potassium carbonate as before, so that operating cost can considerably be reduced.

Figure 3:
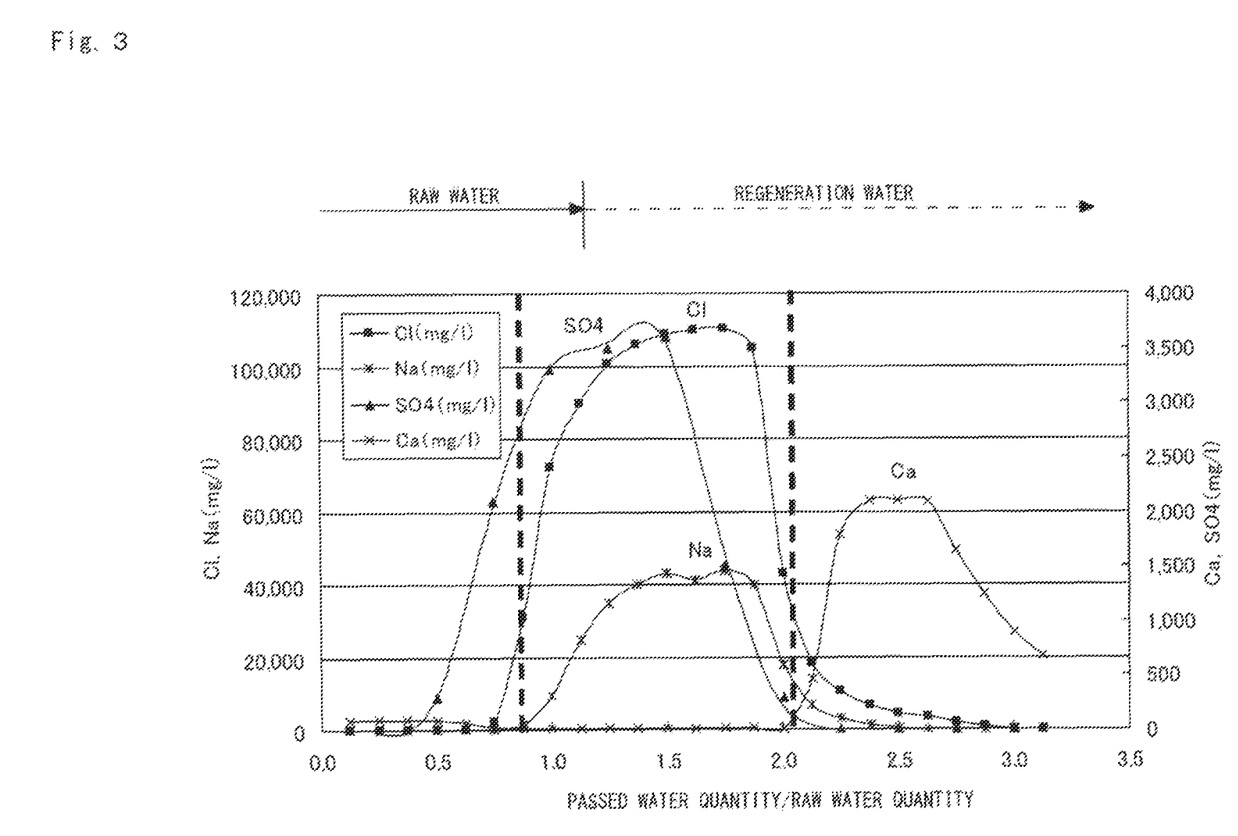
FIG. 3 is a graph showing the first example of the calcium removal method of the present invention.
Figure 4:
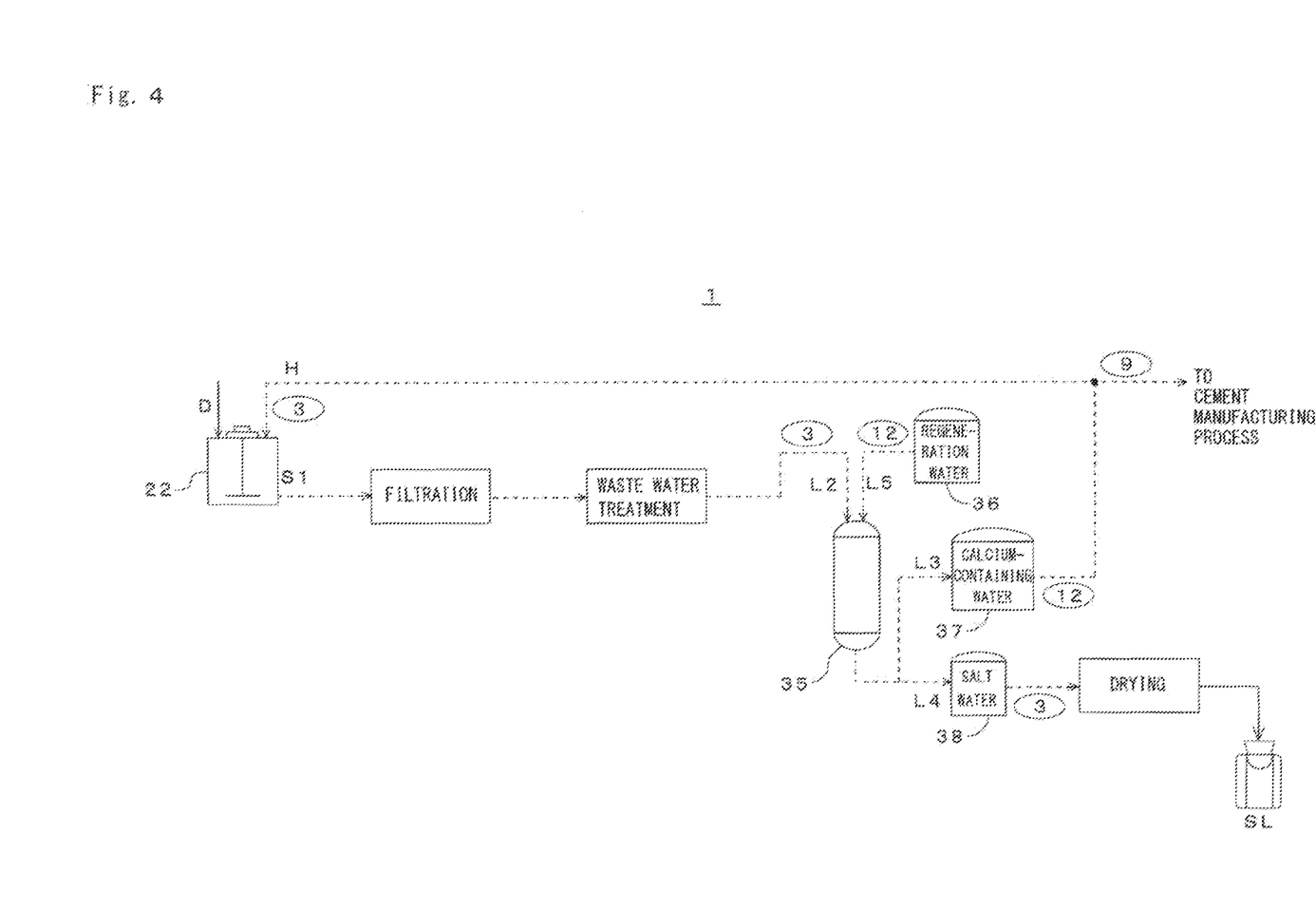
FIG. 4 is a flow chart showing a water balance in the first example of the calcium removal method of the present invention.

Next, the first example of the calcium removal method adapted to the above-mentioned treatment system 1 will be explained. As the ion-exchange resin 35 is used the DIAION AMP03 that is an amphoteric ion-exchange resin manufactured by Mitsubishi Chemical Corporation, and as a raw water is passed the filtrate L2, which is obtained by washing a chlorine bypass dust, through the ion-exchange resin 35, and as the regeneration water L5 is passed a new water three times of the filtrate L2 in quantity through the resin 35, and FIG. 3 and FIG. 4 show a relationship between the quantity of liquid passing through the ion-exchange resin 35 and the concentrations of chloride, $SO_4$, Ca, and Pb contained in the processed liquid passed the ion-exchange resin 35, and a water balance in the treatment system 1. In FIG. 4, the number in an ellipse shows the weight ratio of each water, and the construction of the treatment system 1 is simplified.

In the graph shown in FIG. 3, in the range between 0.8 and 2.0 of passed water quantity/raw water quantity is discharged the salt water L4, and after 2.0 of passed water quantity/raw water quantity is discharged the calcium-containing water L3. As clearly understood from the graph, $SO_4$ as well as Cl and Na can be recovered in the salt water L4.

The water balance at this time is as follows as shown in FIG. 4. When the filtrate L2 of weight 3 and the regeneration water L5 of weight 12 are supplied to the ion-exchange resin 35, the calcium-containing water L3 of weight 12 and the salt water L4 of weight 3 are generated, and weight 3 in the calcium-containing water L3 of weight 12 is returned to the dissolution tank 22 as the hot water H, and remaining weight 9 can be used in a cement manufacturing process.

In the above-mentioned example, the calcium-containing water L3 of weight 9 is used in the cement manufacturing process or the like out of the system 1. On the other hand, in the next second example, the calcium-containing water L3 is not discharged out of the system 1.

Figure 5:
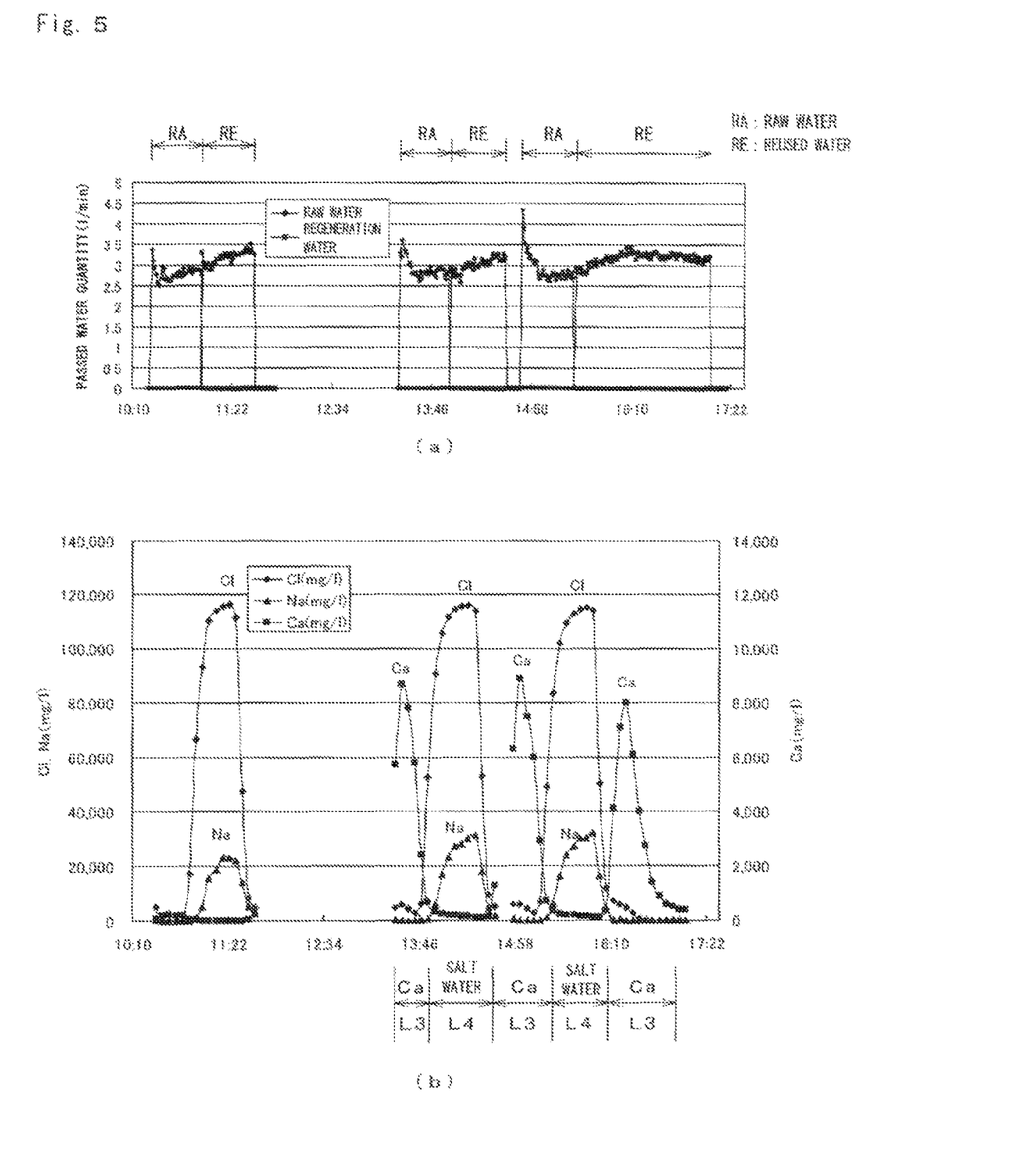
FIG. 5 is a graph showing the second example of the calcium removal method of the present invention.
Figure 6:
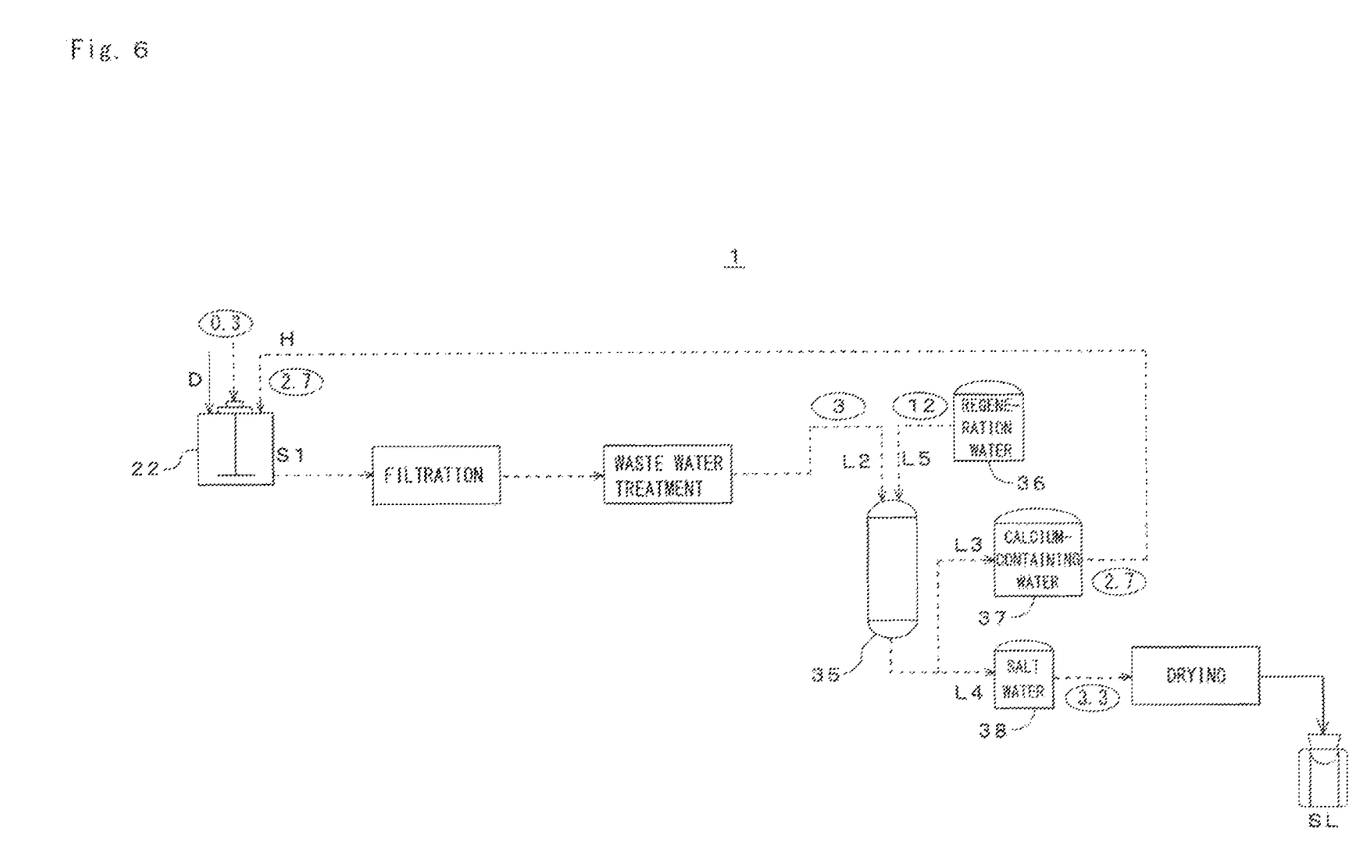
FIG. 6 is a flow chart showing a water balance in the second example of the calcium removal method of the present invention.

In this example also, in the same manner as the first example, as the ion-exchange resin 35 is used the above-mentioned amphoteric ion-exchange resin DIAION AMP03 made by Mitsubishi Chemical Corporation is used, and as a raw water, the filtrate obtained by washing the chlorine bypass dust is passed through the ion-exchange resin 35. In this example, as shown in FIG. 5 (a), a new water, whose quantity is equal to that of the filtrate L2, is passed through the ion-exchange resin 35 as the regeneration water L5, and FIG. 5(b) and FIG. 6 show a relationship between the quantity of liquid passing through the ion-exchange resin 35 and the concentrations of Cl, K, and Na contained in the processed liquid passed the ion-exchange resin 35, and a water balance in the treatment system 1. In FIG. 5, the axis of abscissas represents a time, and in FIG. 6, the number in an ellipse shows the weight ratio of each water, and the construction of the treatment system 1 is simplified.

As is clear from the graph of FIG. 5 (b), not only Cl and Na can be recovered in the salt water L4 (and K can be recovered also although it is not shown in the graph), but also the calcium-containing water L3 and the salt water L4 can be recovered in such a manner that the quantity of each water L3, L4 is substantially the same as that of the raw water.

Therefore, the water balance in this case is as follows as shown in FIG. 6. When the filtrate L2 of weight 3 and the regeneration water L5 of weight 3 are supplied to the ion-exchange resin 35, the calcium-containing water L3 of weight 2.7 and the salt water L4 of weight 3.3 are generated, and all of the calcium-containing water L3 of weight 2.7 is returned to the dissolution tank 22 and a new dissolution water of weight 0.3 is supplied to the dissolution tank 22, which allows the operation to be continued and avoids discharge of the calcium-containing water L3 out of the treatment system 1.

In the above-mentioned second example, in addition that discharge of the calcium-containing water L3 out of the system can be avoided, there is an effect that potassium or/and sodium, and calcium can precisely be separately with each other. Hereafter, this point will be explained in detail.

Figure 7:
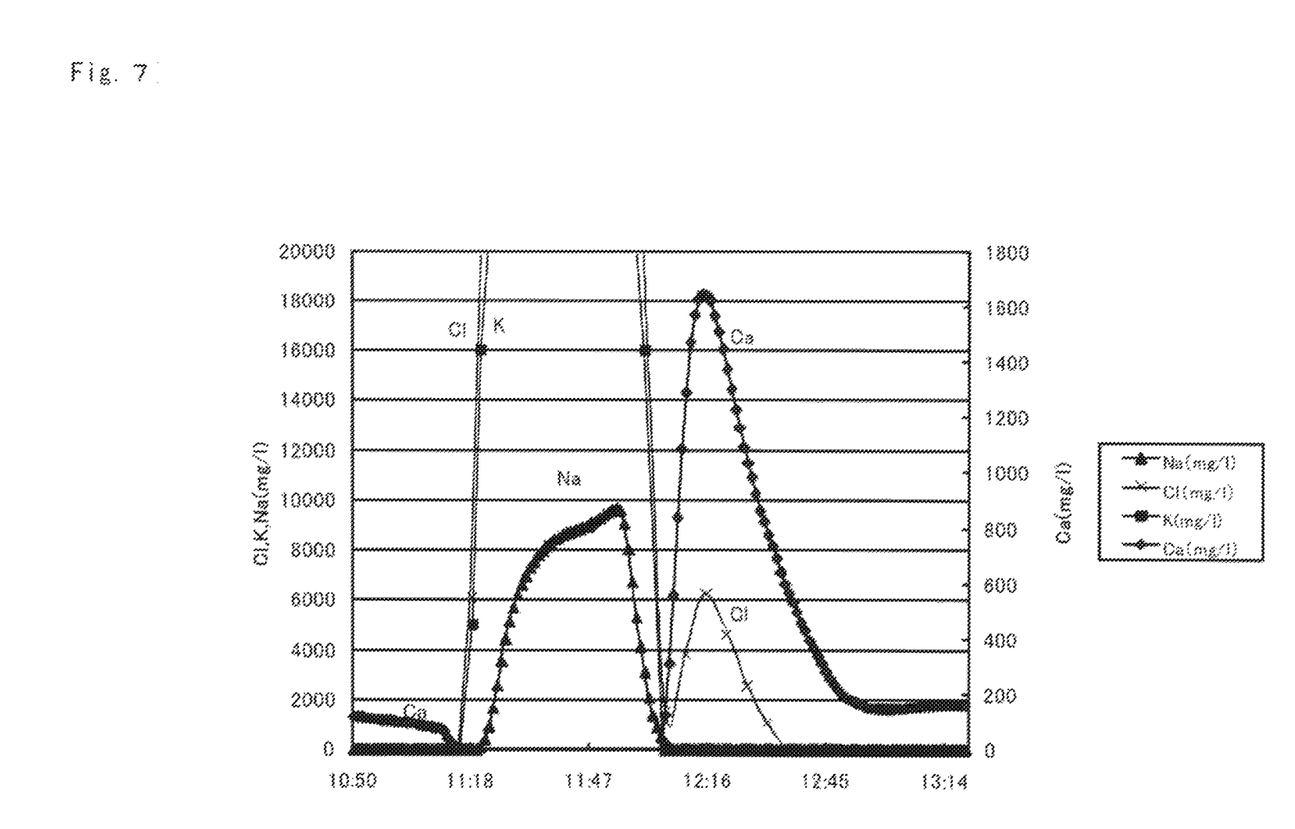
FIG. 7 is a graph showing a comparative example of the calcium removal method of the present invention.

FIG. 7 is a graph showing a comparative example of the calcium removal method according to the present invention. When potassium (K) that shows the same action as chlorine (Cl) begins to be discharged from the ion-exchange resin 35 (around 11:18 at the time of the axis of abscissas), calcium opposes this and is no longer detected. Further, after 12:45 at the time of the axis of abscissas the amount of discharged potassium is 0 (zero), and no opposition is generated, which allows calcium to be discharged little by little without the amount of discharged calcium becoming 0 (zero).

Therefore, in this example, bringing forward the timing for starting introduction of the filtrate L2, which is obtained by washing the chlorine bypass dust, as a raw water, as shown in FIG. 5, by utilizing opposition of calcium caused by potassium (K), potassium or/and sodium, and calcium can be separated with high precision.

Figure 8:
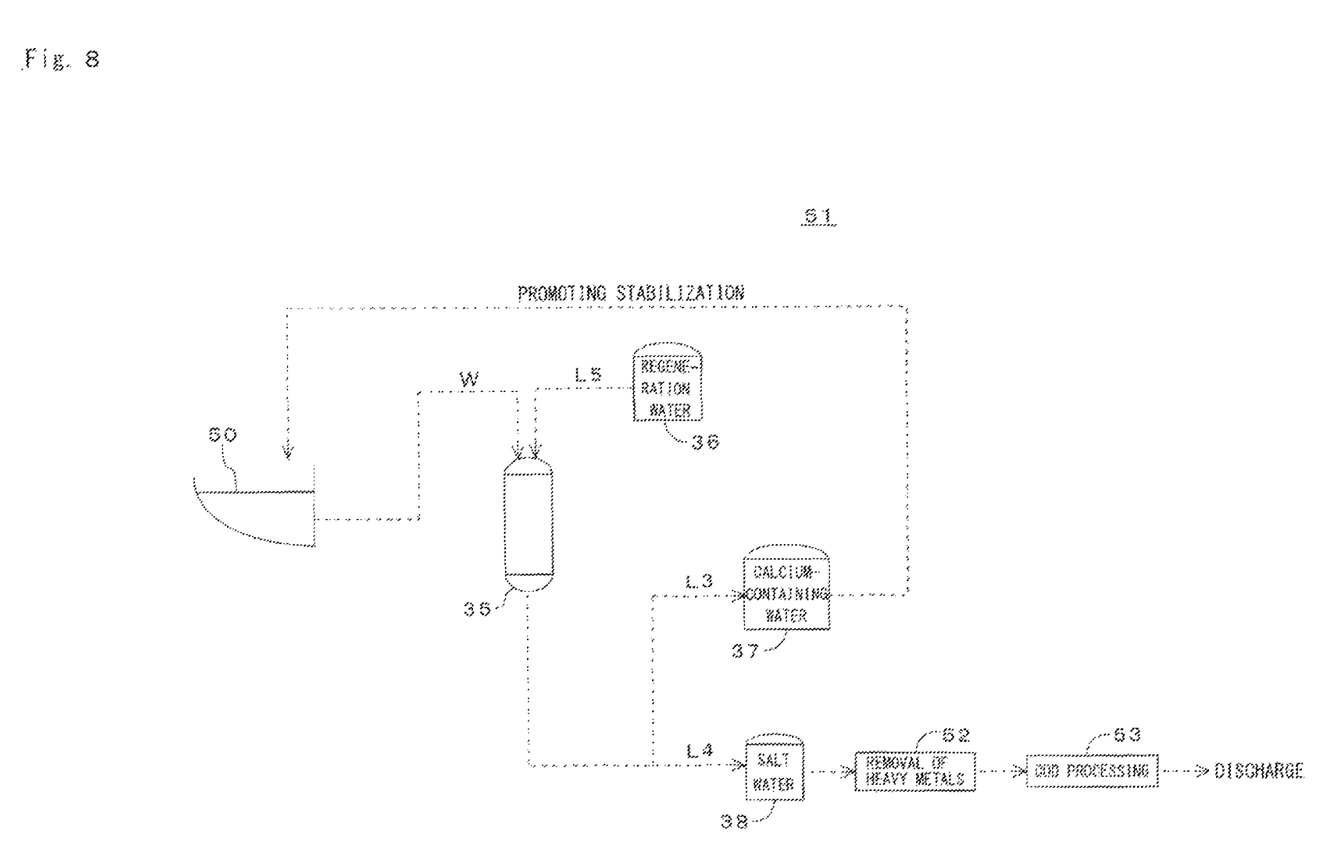
FIG. 8 is a flow chart showing the case that a leachate of a final disposal site is treated by using the calcium removal method of the present invention.

Next, as the second embodiment of a calcium removal method according to the present invention, the case where the method is applied to treatment of leachate of a final disposal site will be explained with reference to FIG. 8.

This treatment system 51 is installed to release a leachate W of a final disposal site 50 after removing calcium and heavy metals from the leachate W and decrease COD of the leachate W, and so on, and is provided with the same apparatus from the ion-exchange resin 35 to the salt water tank 38 as those shown in FIG. 1, and a heavy metals removal device 52 and a COD treatment device 53.

The heavy metals removal device 52 is installed to remove heavy metals such as lead, and in place of this device 52 can be used the chemical liquid reaction tank 32, the filter press 33 and so on, and other generally used devices can be utilized. And, for the COD treatment device 53 also, generally used removal devices can be utilized.

In this embodiment also, the apparatus from the ion-exchange resin 35 to the salt water tank 38 function in the same manner as the treatment system 1 shown in FIG. 1; calcium contained in fly ash, fly ash and others is removed with the ion-exchange resin 35; the calcium-containing water L3 is returned to the final disposal site 50 for promoting stabilization; from the salt water L4 is removed heavy metals with the heavy metals removal device 52; and further COD is decreased with the COD treatment device 53 and is released.

As mentioned above, in this embodiment, from the leachate W of the final disposal site 50 is removed calcium with the ion-exchange resin 35 and the leachate W is released after detoxication, and the calcium-containing water L3 is returned to the final disposal site 50 to facilitate stabilization of the final disposal site 50.

EXPLANATION OF REFERENCE NUMBERS 1 system for treating dust contained in extracted cement kiln combustion gas
2 washing process
3 process for removing calcium and others
4 salt recovery process
21 tank
22 dissolution tank
23 filtering machine
24 hot water tank
25 storage tank
32 (32A, 32B) chemical liquid reaction tanks
33 filter press
34 sand filtering machine
35 ion-exchange resin
36 regeneration water tank
37 calcium-containing water tank
38 salt water tank
41 spray dryer
42 bag filter
43 pelletizer
50 final disposal site
51 treatment system
52 heavy metals removal device
53 COD treatment device

The invention claimed is:

1. A method of removing calcium from a solution containing potassium or/and sodium, and calcium using water and an ion-exchange resin to separate said solution containing potassium or/and sodium, and calcium into a solution containing potassium or/and the sodium and a solution containing calcium, wherein the method comprises the steps of:
  (a) providing an amphoteric ion-exchange resin filled up with said water;
  (b) introducing the solution containing potassium or/and sodium, and calcium into the amphoteric ion-exchange resin;

(c) introducing said water for regenerating the amphoteric ion-exchange resin;

(d) discharging the solution containing potassium or/and sodium from the amphoteric ion-exchange resin;

(e) discharging the solution containing calcium from the amphoteric ion-exchange resin separate from the discharging in step (d) so as to separate the solution containing potassium or/and sodium from the solution containing calcium; and (f) repeating steps (b) to (e).

2. The calcium removal method as claimed in claim 1, wherein said solution containing potassium or/and sodium, and calcium is a filtrate obtained by washing chlorine bypass dust generated in a cement burning process.

3. The calcium removal method as claimed in claim 2, further comprising a step of adjusting an amount of the filtrate supplied to the amphoteric ion-exchange resin and an amount of said water supplied to said amphoteric ion-exchange resin to equalize an amount of separated calcium-containing water to the amount of the supplied filtrate.

4. The calcium removal method as claimed in claim 3, wherein at least one step selected from the group consisting of:

adjustment of the amount of the filtrate supplied to the amphoteric ion-exchange resin;

adjustment of the amount of said water supplied to the amphoteric ion-exchange resin; and control of timing for separately collecting the solution containing sodium and/or potassium and the calcium-containing water from the amphoteric ion-exchange resin is performed based on at least one measurement result, and wherein said at least one measurement is selected from the group consisting of:

a calcium or chlorine concentration;

electrical conductivity; and pH of a fluid which is discharged from the amphoteric ion-exchange resin.

5. The calcium removal method as claimed in claim 2, further comprising a step of adjusting an amount of the filtrate supplied to the amphoteric ion-exchange resin and an amount of said water supplied to said amphoteric ion-exchange resin to increase an amount of separated calcium-containing water than the amount of the supplied filtrate.

6. The calcium removal method as claimed in claim 5, wherein at least one step selected from the group consisting of:

adjustment of the amount of the filtrate supplied to the amphoteric ion-exchange resin;

adjustment of the amount of said water supplied to the amphoteric ion-exchange resin; and control of timing for separately collecting the solution containing sodium and/or potassium and the calcium-containing water from the amphoteric ion-exchange resin is performed based on at least one measurement result, and wherein said at least one measurement is selected from the group consisting of:

a calcium or chlorine concentration;

electrical conductivity; and pH of a fluid which is discharged from the amphoteric ion-exchange resin.

7. The calcium removal method as claimed in claim 1, wherein said solution is a leachate of a final disposal site.

8. A method for providing calcium containing water comprising the steps of:

(a) obtaining a solution containing potassium or/and sodium, and calcium, wherein said solution is one of a filtrate obtained by washing chlorine bypass dust generated in a cement burning process and a leachate solution obtained from a final disposal site;

(b) supplying a regeneration water that consists essentially of pure water;

(c) providing an amphoteric ion-exchange resin;

(d) introducing the solution containing potassium or/and sodium, and calcium into the ion-exchange resin;

(e) introducing the regeneration water into the ion exchange resin to regenerate the ion-exchange resin;

(f) separately collecting a solution containing sodium and/or potassium and the calcium-containing water from the ion exchange resin during the step of introducing the regeneration water; and (g) directing the calcium-containing water collected in step (f) to step (a) to wash chlorine bypass dust or to the final disposal site to produce the leachate solution.

9. The calcium removal method as claimed in claim 8, wherein said solution containing potassium or/and sodium, and calcium is said filtrate obtained by washing chlorine bypass dust generated in a cement burning process.

10. The calcium removal method as claimed in claim 9, further comprising a step of adjusting an amount of the filtrate supplied to the ion-exchange resin and an amount of a regeneration water supplied to said ion-exchange resin to equalize an amount of separated calcium-containing water to an amount of the supplied filtrate.

11. The calcium removal method as claimed in claim 10, wherein at least one step selected from the group consisting of adjustment of an amount of a filtrate supplied to the ion-exchange resin, adjustment of an amount of the regeneration water supplied to the ion-exchange resin, and control of timing for separately collecting the solution containing sodium and/or potassium and the calcium-containing water from the ion-exchange resin is performed based on at least one measurement result, and wherein said at least one measurement is selected from the group consisting of a calcium or chlorine concentration, electrical conductivity, and pH of a fluid which is discharged from the ion-exchange resin.

12. The calcium removal method as claimed in claim 9, further comprising a step of adjusting an amount of the filtrate supplied to the ion-exchange resin and an amount of the regeneration water supplied to said ion-exchange resin to increase an amount of collected calcium-containing water relative to an amount of the supplied filtrate.

13. The calcium removal method as claimed in claim 12, wherein at least one step selected from the group consisting of adjustment of an amount of the filtrate supplied to the ion-exchange resin, adjustment of an amount of the regeneration water supplied to the ion-exchange resin, and control of timing for separately collecting the solution containing sodium and/or potassium and the calcium-containing water from the ion-exchange resin is performed based on at least one measurement result, and wherein said at least one measurement is selected from the group consisting of a calcium or chlorine concentration, electrical conductivity, and pH of a fluid which is discharged from the ion-exchange resin.

14. The calcium removal method as claimed in claim 8, wherein said solution is said leachate of a final disposal site.

* * * * *